(12) United States Patent
A et al.

(10) Patent No.: US 10,735,251 B2
(45) Date of Patent: *Aug. 4, 2020

(54) DEADLOCK AVOIDANCE USING MODIFIED ETHERNET CONNECTIVITY FAULT MANAGEMENT SIGNALING

(71) Applicant: Juniper Networks, Inc., Sunnyvale, CA (US)

(72) Inventors: Vamsi Krishna A, Bangalore (IN); Sudheendra Bellamkonda, Bangalore (IN); Paleti Venkata Ramana, Bangalore (IN); Prabhu Raj V.K., Bangalore (IN); Viswanath KJ, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/257,973

(22) Filed: Jan. 25, 2019

(65) Prior Publication Data
US 2019/0158350 A1    May 23, 2019

Related U.S. Application Data

(63) Continuation of application No. 15/387,315, filed on Dec. 21, 2016, now Pat. No. 10,193,746.

(51) Int. Cl.
*H04L 12/24* (2006.01)
*H04L 12/26* (2006.01)

(52) U.S. Cl.
CPC ...... *H04L 41/0672* (2013.01); *H04L 41/0659* (2013.01); *H04L 41/0677* (2013.01); *H04L 43/0811* (2013.01); *H04L 43/10* (2013.01)

(58) Field of Classification Search
CPC ............. H04L 41/0672; H04L 43/0811; H04L 41/0677; H04L 43/10; H04L 41/0659; H04L 12/24; H04L 12/26
(Continued)

(56) References Cited

U.S. PATENT DOCUMENTS 7,995,488 B2 * 8/2011 Ding .................. H04L 12/2856
370/241.1
8,144,576 B2    3/2012 Saltsidis
(Continued)

OTHER PUBLICATIONS

Wikipedia, "IEEE 802.1ag," https://en.wikipedia.org/wiki/IEEE_802.1ag, Jul. 22, 2015, 3 pages.
(Continued)

*Primary Examiner* — Man U Phan
(74) *Attorney, Agent, or Firm* — Harrity & Harrity, LLP

(57) ABSTRACT

A first maintenance endpoint (MEP) device may identify that a first interface of the first MEP device is associated with a connectivity failure. The first MEP device may provide, to a second MEP device, a first continuity check message (CCM), that includes a MEP identifier of the first MEP device. The first CCM may cause the second MEP device to designate a second interface of the second MEP device as being offline. The first MEP device may receive, from the second MEP device, a second CCM, that includes the MEP identifier of the first MEP device and information indicating that the second interface of the second MEP device is offline. The first MEP device may execute a rule to avoid a deadlock situation based on the second CCM including the MEP identifier of the first MEP device.

20 Claims, 10 Drawing Sheets

(58) Field of Classification Search
USPC .......................................................... 370/216
See application file for complete search history.

(56) References Cited

U.S. PATENT DOCUMENTS

| | | | |
|---|---|---|---|
| 8,432,833 B2 | 4/2013 | Rustagi | |
| 8,441,942 B1 | 5/2013 | Guha | |
| 8,588,060 B2 | 11/2013 | Holness | |
| 8,611,231 B2* | 12/2013 | Ding | H04L 12/2856 |
| | | | 370/241.1 |
| 9,088,438 B2* | 7/2015 | Gohite | H04L 12/4641 |
| 9,350,628 B2* | 5/2016 | Salam | H04L 41/0213 |
| 9,503,338 B2 | 11/2016 | Mishra | |
| 9,531,625 B2* | 12/2016 | Cordes | G06F 3/067 |
| 9,800,432 B2 | 10/2017 | Gohite | |
| 9,960,985 B2* | 5/2018 | Cordes | G06F 3/067 |
| 9,985,862 B2* | 5/2018 | Hu | H04L 12/413 |
| 10,193,746 B2 | 1/2019 | A | |
| 2012/0087232 A1 | 4/2012 | Hanabe et al. | |
| 2016/0041888 A1* | 2/2016 | Hanabe | H04L 41/0659 |
| | | | 714/4.21 |
| 2016/0182361 A1 | 6/2016 | Rouyer | |
| 2016/0352624 A1 | 12/2016 | Mishra | |
| 2017/0034043 A1* | 2/2017 | Tochio | H04L 43/0823 |
| 2017/0142002 A1* | 5/2017 | Saito | H04L 43/10 |
| 2017/0155522 A1* | 6/2017 | Fukaya | H04L 12/1868 |
| 2017/0359249 A1 | 12/2017 | Holness | |

OTHER PUBLICATIONS

Extended European Search Report corresponding to EP 17164250.7, dated Sep. 29, 2017, 11 pages.

* cited by examiner

DEADLOCK AVOIDANCE USING MODIFIED ETHERNET CONNECTIVITY FAULT MANAGEMENT SIGNALING

RELATED APPLICATION

This application is a continuation of U.S. patent application Ser. No. 15/387,315, filed Dec. 21, 2016 (now U.S. Pat. No. 10,193,746), which is incorporated herein by reference.

BACKGROUND

The Institute of Electrical Engineers (IEEE) 802.1ag standard, also known as Ethernet Connectivity Fault Management (CFM), defines protocols and practices for Operations, Administration, and Management (OAM) for paths through local area networks (LANs), metropolitan area networks (MANs), and wide area networks (WANs). The standard defines protocols and procedures for monitoring, detecting, verifying, and isolating connectivity failures in various networks.

SUMMARY

According to some possible implementations, a first maintenance endpoint (MEP) device may include one or more processors to identify that a first interface of the first MEP device is associated with a connectivity failure. The one or more processors may provide, to a second MEP device, a first continuity check message (CCM), that includes a MEP identifier of the first MEP device, based on identifying that the first interface of the first MEP device is associated with the connectivity failure. The first CCM may cause the second MEP device to designate a second interface of the second MEP device as being offline. The one or more processors may receive, from the second MEP device, a second CCM, that includes the MEP identifier of the first MEP device and information indicating that the second interface of the second MEP device is offline, based on the second MEP device designating the second interface of the second MEP device as being offline. The one or more processors may execute a rule to avoid a deadlock situation based on the second CCM including the MEP identifier of the first MEP device.

According to some possible implementations, a non-transitory computer-readable medium may store one or more instructions that, when executed by one or more processors of a first maintenance endpoint (MEP) device, cause the one or more processors to identify that a first interface of the first MEP device is associated with a connectivity failure. The one or more instructions may cause the one or more processors to provide, to a second MEP device, a first continuity check message (CCM), that includes a MEP identifier of the first MEP device, based on identifying that the first interface of the first MEP device is associated with the connectivity failure. The first CCM may cause the second MEP device to designate a second interface of the second MEP device as being offline. The one or more instructions may cause the one or more processors to receive, from the second MEP device, a second CCM, that includes the MEP identifier of the first MEP device and information indicating that the second interface of the second MEP device is offline based on the second MEP device designating the second interface of the second MEP device as being offline. The one or more instructions may cause the one or more processors to execute a rule to avoid a deadlock situation, involving the first interface and the second interface, based on the second CCM including the MEP identifier of the first MEP device.

According to some possible implementations, a method may include identifying, by a first maintenance endpoint (MEP) device, that a first interface of the first MEP device is unavailable. The method may include providing, by the first MEP device and to a second MEP device, a first continuity check message (CCM), that includes a MEP identifier of the first MEP device, based on identifying that the first interface of the first MEP device is unavailable. The first CCM may cause the second MEP device to designate a second interface of the second MEP device as being offline. The method may include receiving, by the first MEP device and from the second MEP device, a second CCM, that includes the MEP identifier of the first MEP device and information indicating that the second interface of the second MEP device is offline, based on the second MEP device designating the second interface of the second MEP device as being offline. The method may include executing, by the first MEP device, a rule to avoid a deadlock situation based on the second CCM including the MEP identifier of the first MEP device.

DETAILED DESCRIPTION

Figure 1A:
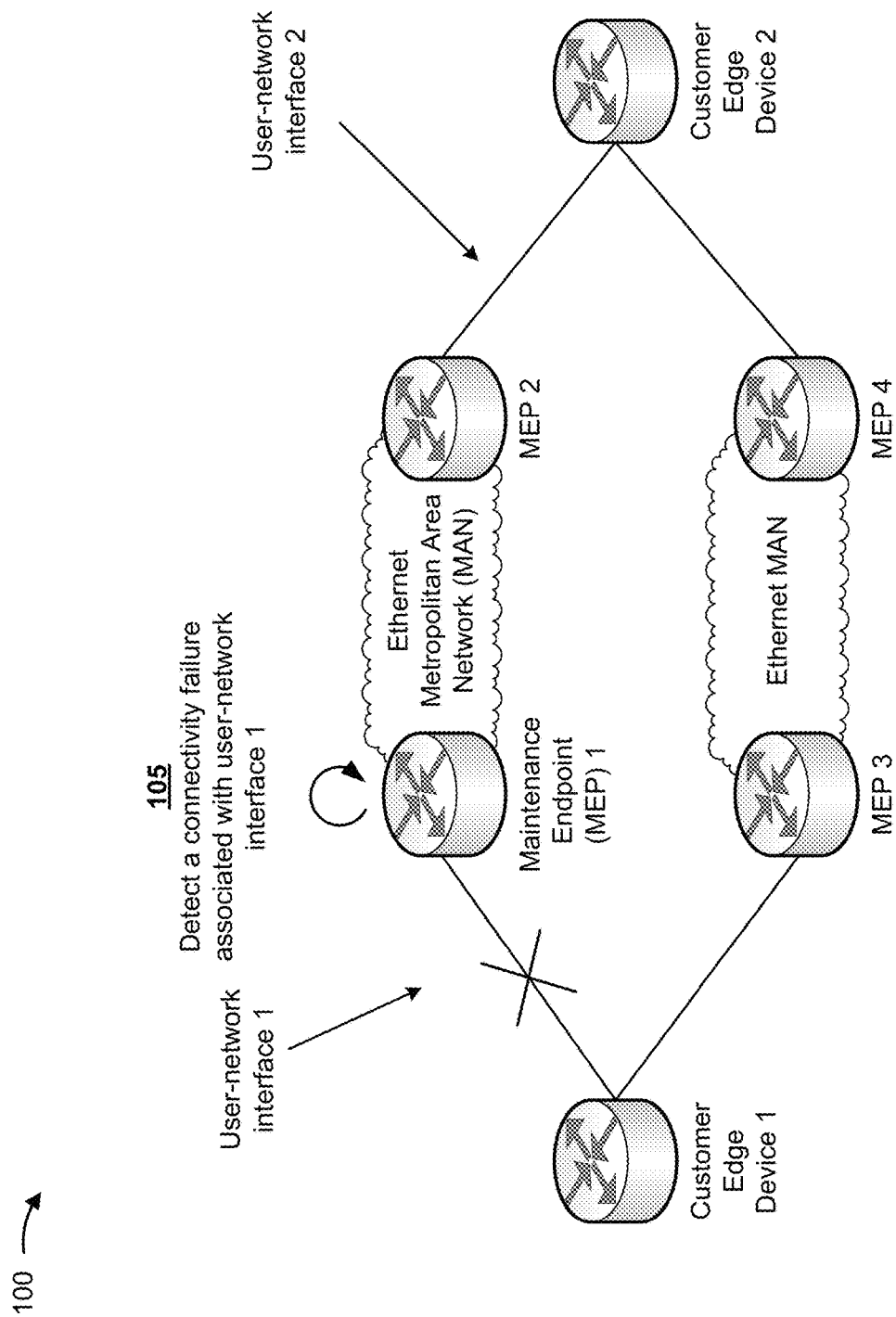
FIGS. 1A-1E are diagrams of an overview of an example implementation described herein.

The following detailed description of example implementations refers to the accompanying drawings. The same reference numbers in different drawings may identify the same or similar elements.

Network devices (e.g., routers, switches, etc.) may be associated with a particular maintenance domain. For example, a maintenance domain may refer to a network, or a portion of a network, where faults in connectivity may be managed. Additionally, the network devices may be associated with a particular maintenance association. For example, a maintenance association may refer to a set of network devices, referred to as maintenance endpoints (MEPs), that are each configured with the same maintenance association identifier, and are established to monitor and verify the integrity of a service instance throughout a maintenance domain.

In some cases, MEPs may exchange continuity check messages (CCMs) that include information identifying respective statuses of interfaces associated with respective MEPs. For example, assume that a first MEP and a second MEP are associated with a MAN, that the first MEP establishes connectivity with a first customer edge device (e.g., a router, a switch, or the like), and that the second MEP establishes connectivity with a second customer edge device. In this case, network traffic may be exchanged between the first customer edge device and the second customer edge device via the MAN and via the first MEP and the second MEP.

As an example, assume that a first user-network interface associated with the first MEP and the first customer edge device is associated with a connectivity failure (e.g., an optical fiber cable is damaged, destroyed, unavailable, etc.). In this case, the first MEP may provide, to the second MEP, a CCM that identifies that the first user-network interface is "down" (e.g., incapable of providing and/or receiving network traffic). In this case, the second MEP may designate a second user-network interface associated with the second MEP and the second customer edge device as being offline. As used herein, "designate as being offline" may refer to the process by which a MEP does not advertise an interface as being capable of receiving network traffic, the process by which a MEP prevents network traffic from being provided throughout a maintenance domain, or the like. In this way, the second customer edge device may prevent network traffic from being provided to the second MEP (e.g., because the first MEP is associated with a connectivity failure).

In some cases, a deadlock situation may occur based on CFM signaling. For example, continuing the example, the second MEP may provide, to the first MEP, a CCM that identifies that the second user-network interface is designated as offline (e.g., based on designating the second user-network interface as offline based on the CCM from the first MEP). The first MEP may receive, from the second MEP, the CCM and designate the first user-network interface associated with the first MEP and the first customer edge device as offline based on the CCM. As an example, assume that the first user-network interface is no longer associated with the connectivity failure (e.g., the optical fiber cable was repaired, becomes available, or the like). In this case, the first MEP may receive, from the second MEP, a CCM that identifies that the second user-network interface is designated as offline, and may designate the first user-network interface as offline (e.g., based on incorrectly determining that the second MEP is associated with a connectivity failure). In this way, the first MEP and the second MEP may designate respective user-network interfaces as offline despite the non-existence of connectivity failures, thereby inducing a deadlock situation.

Implementations described herein enable a first MEP to provide a first CCM that identifies a connectivity failure, which may cause a second MEP to perform an action (e.g., designate an interface as offline). The second MEP may provide a second CCM that identifies an interface status of the second MEP being designated as offline, and also identifies an identifier of the first MEP. The first MEP may receive the second CCM, identify the identifier of the first MEP, and execute a rule to avoid a deadlock situation (e.g., by preventing an action, associated with designating an interface of the first MEP as offline, from being performed based on the identifier of the first MEP). In this way, deadlock situations may be avoided, thereby improving network operations based on utilizing available resources.

FIGS. 1A-1E are diagrams of an overview of an example implementation 100 described herein. As shown in FIG. 1A, and by reference number 105, MEP 1 may detect a connectivity failure associated with user-network interface 1. For example, assume that an optical link between customer edge device 1 and MEP 1 is associated with a failure (e.g., the optical link has been damaged, or the like). In this case, MEP 1 may identify that an interface of MEP 1 is associated with the connectivity failure. Based on the connectivity failure, MEP 1 may be unable to provide network traffic to and/or receive network traffic from customer edge device 1 (e.g., via user-network interface 1).

Figure 1B:
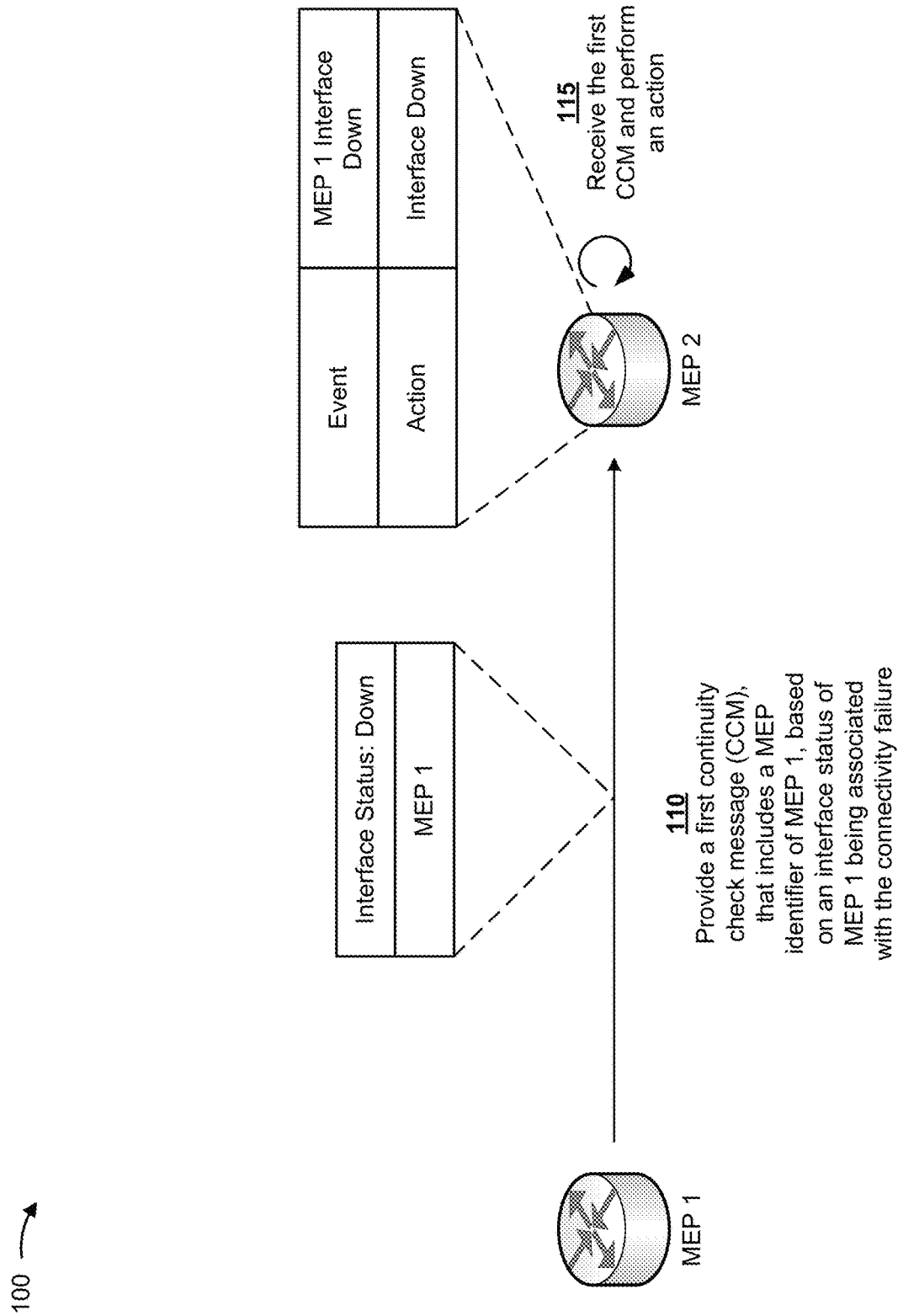

As shown in FIG. 1B, and by reference number 110, MEP 1 may provide a first CCM, that includes a MEP identifier of MEP 1, based on an interface status of MEP 1 being associated with the connectivity failure. As shown, the first CCM may include Type, Length, Value (TLV) information that identifies an interface status of MEP 1 (e.g., "Down"), and may include an extended status TLV that includes information that identifies a MEP identifier of MEP 1 (e.g., "MEP 1"). As further shown in FIG. 1B, and by reference number 115, MEP 2 may receive the first CCM and perform an action. For example, MEP 2 may store (e.g., in a list, a table, or another type of data structure) information identifying an action profile, which maps a set of events and a set of actions. As shown, based on the event "MEP 1 Interface Down," MEP 2 may perform an action associated with the event (e.g., MEP 2 may designate user-network interface 2 as offline). Based on MEP 2 designating user-network interface 2 as offline, network traffic, between customer edge device 2 and customer edge device 1, may be routed through another path (e.g., associated with MEP 3 and MEP 4).

Figure 1C:
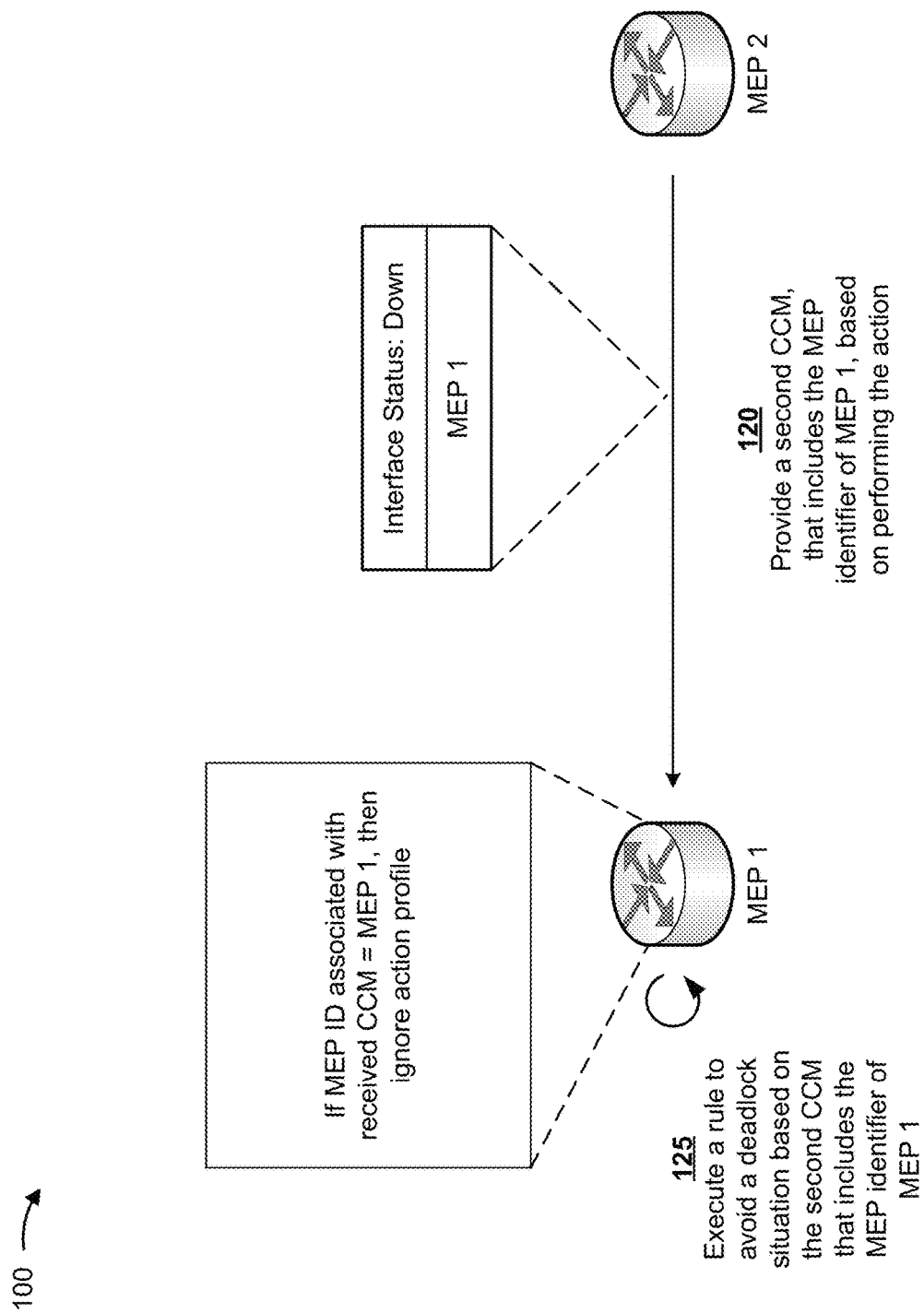

As shown in FIG. 1C, and by reference number 120, MEP 2 may provide a second CCM, that includes the MEP identifier of MEP 1, based on performing the action. For example, as shown, the second CCM may include information that identifies an interface status of MEP 2 (e.g., "Down"), and may include information that identifies a MEP identifier of MEP 1 (e.g., "MEP 1"). In this way, MEP 1 may receive the second CCM, and identify the MEP identifier of MEP 1.

As further shown in FIG. 1C, and by reference number 125, MEP 1 may execute a rule to avoid a deadlock situation based on the extended status TLV of the second CCM that includes the MEP identifier of MEP 1. For example, as shown, MEP 1 may store information that causes MEP 1 to execute a rule to prevent an action, associated with an action profile, from being performed based on a CCM including the MEP identifier of MEP 1 (e.g., "MEP 1"). In this way, MEP 1 may prevent a deadlock situation. For example, if MEP 1 performed an action based on the second CCM (e.g., caused user-network interface 1 to be designated as offline), then MEP 1 would have caused an action to be performed based on an underlying connectivity failure associated with MEP 1 (e.g., incorrectly determining a connectivity failure associated with user-network interface of MEP 2).

Figure 1D:
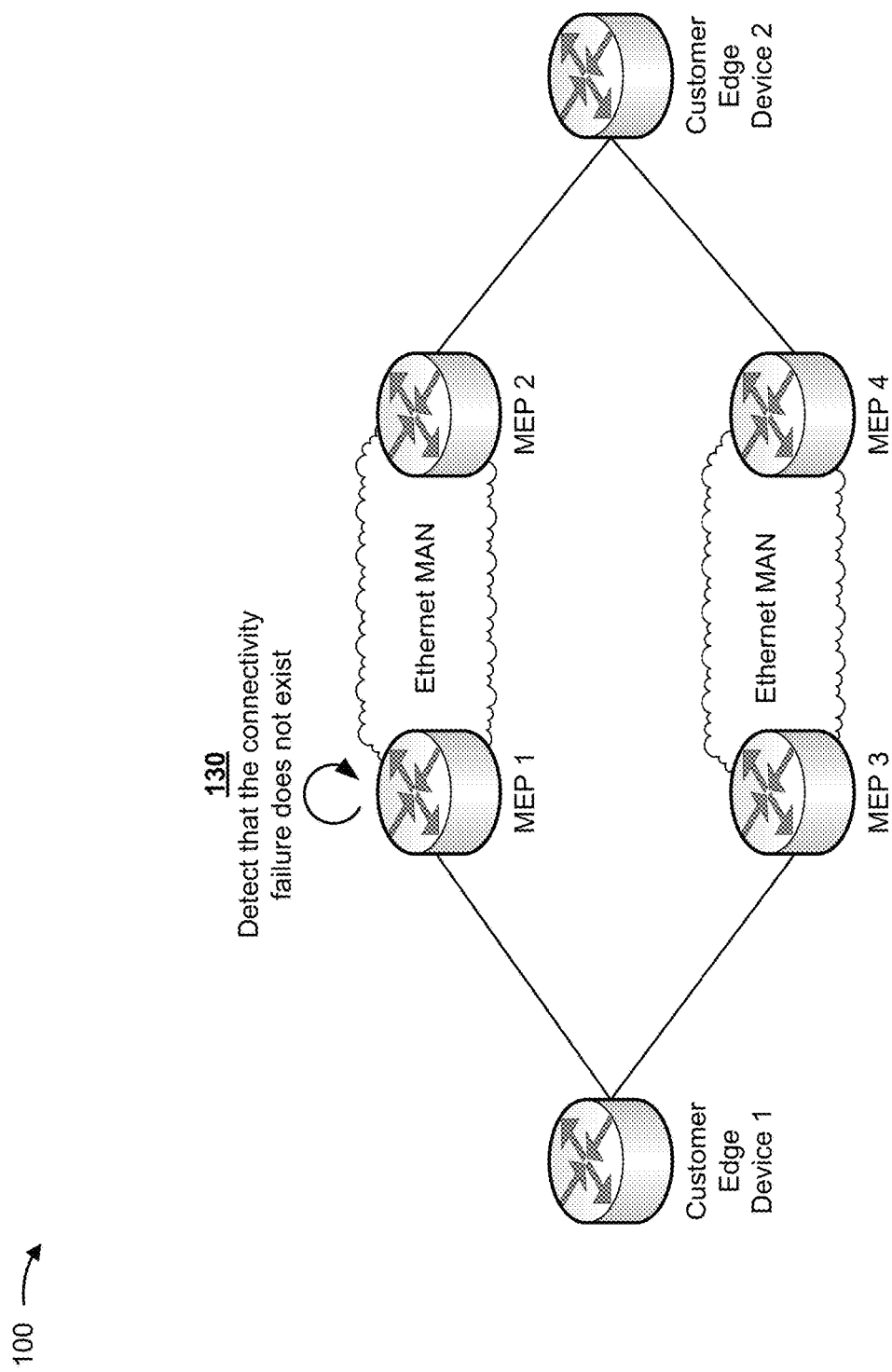

As shown in FIG. 1D, and by reference number 130, MEP 1 may detect that the connectivity failure has been resolved. For example, MEP 1 may determine that MEP 1 may provide network traffic to and receive network traffic from customer edge device 1 via user-network interface 1.

Figure 1E:
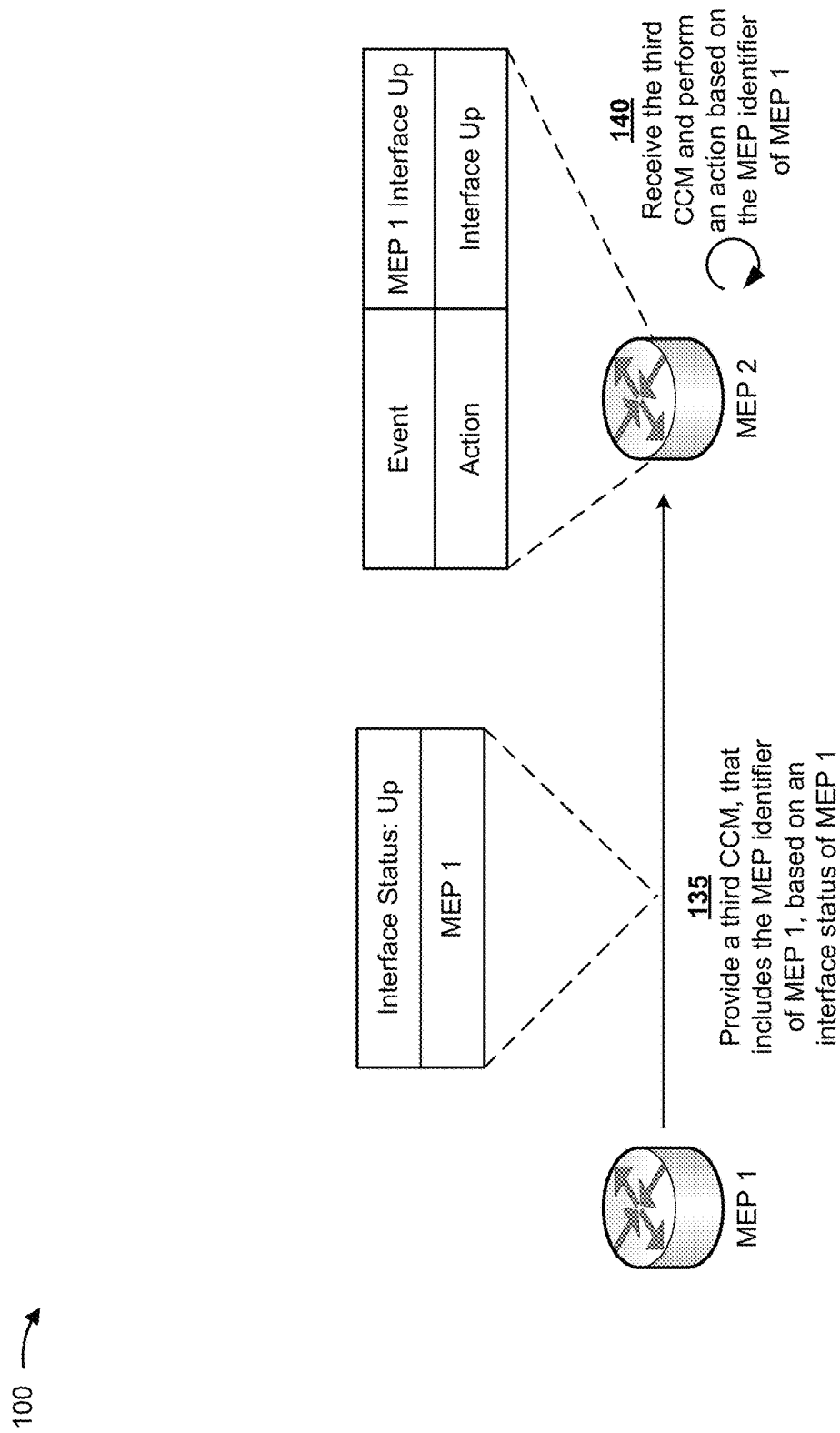

As shown in FIG. 1E, and by reference number 135, MEP 1 may provide a third CCM, that includes the MEP identifier of MEP 1, based on an interface status of MEP 1. As shown, the third CCM may include information that identifies an interface status of MEP 1 (e.g., "Up"), and may include information that identifies the MEP identifier of MEP 1 (e.g., "MEP 1"). As further shown in FIG. 1E, and by reference number 140, MEP 2 may receive the third CCM and perform an action based on the MEP identifier of MEP 1. For example, MEP 2 may determine that user-network interface 1 is online, and may designate user-network interface 2 as online (e.g., become capable of receiving and/or providing network traffic).

Based on user-network interface 2 being designated as online, network traffic, from customer edge device 2 to customer edge device 1, may be routed through a path associated with MEP 1 and MEP 2. In this way, a deadlock situation is avoided. For example, a deadlock situation may be associated with the scenario where MEP 1 and MEP 2 designate respective user-network interfaces as offline, despite the non-existence of an underlying connectivity failure. Implementations described herein enable MEPs to exchange CCMs without causing deadlocks. In this way, implementations described herein improve network operations by utilizing available network resources.

As indicated above, FIGS. 1A-1E are provided merely as an example. Other examples are possible and may differ from what was described with regard to FIGS. 1A-1E.

Figure 2:
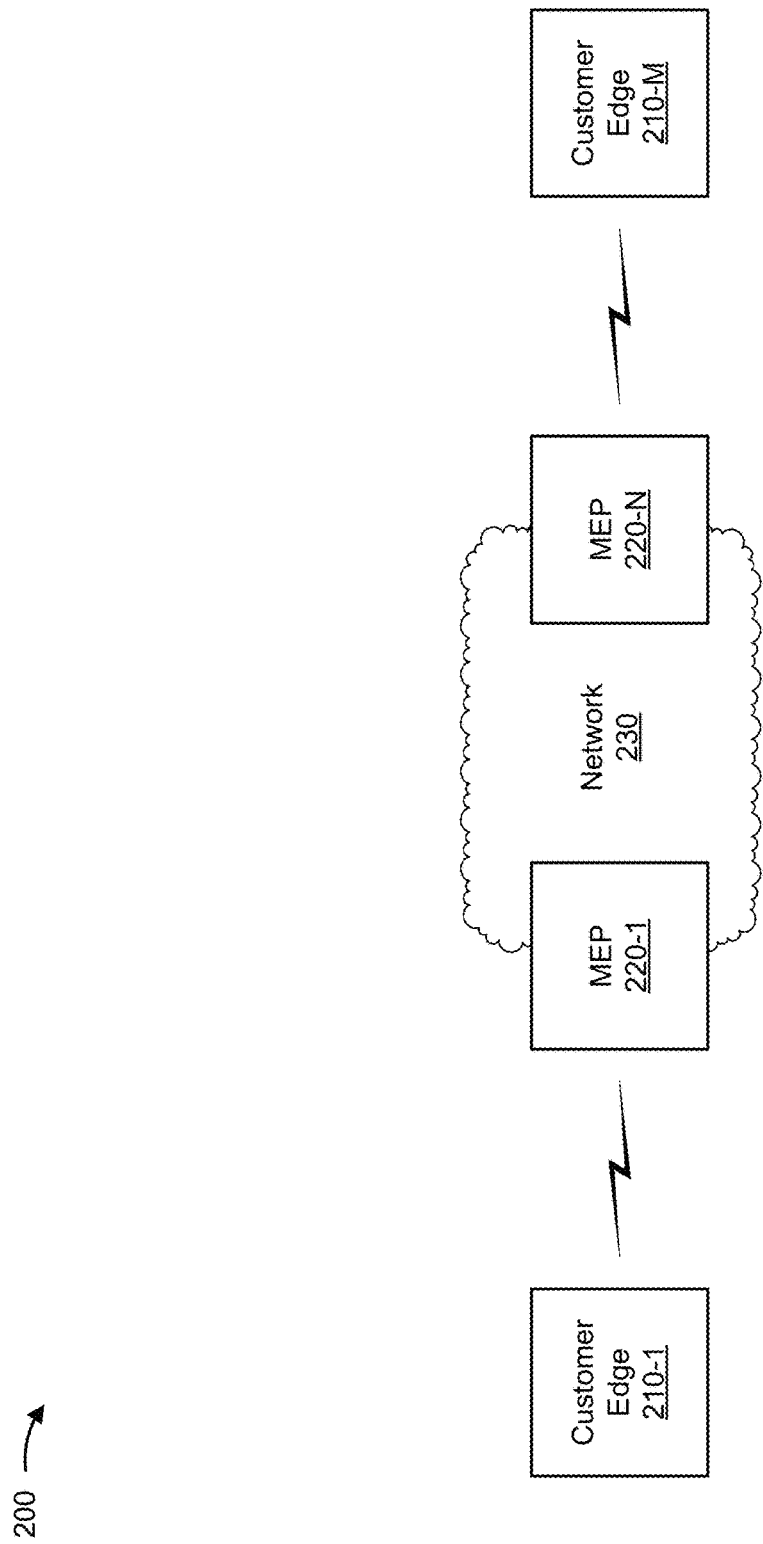
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include one or more customer edge devices 210-1 through 210-M (M≥1) (hereinafter referred to collectively as "customer edge devices 210," and individually as "customer edge device 210"), one or more MEPs 220-1 through 220-N (N≥1) (hereinafter referred to collectively as "MEPs 220," and individually as "MEP 220"), and a network 230. Devices of environment 200 may interconnect via wired connections, wireless connections, or a combination of wired and wireless connections.

Customer edge device 210 includes one or more network devices (e.g., one or more traffic transfer devices) capable of processing and transferring network traffic. For example, customer edge device 210 may include a router, a gateway, a switch, a firewall, a hub, a bridge, a reverse proxy, a server (e.g., a proxy server, a server executing a virtual machine, etc.), a security device, an intrusion detection device, a load balancer, a line card (e.g., in a chassis-based system), or a similar type of device. In some implementations, customer edge device 210 may be located on an edge of a customer premises, and may communicate with MEP 220 to gain access to a service provider's core network.

MEP 220 includes one or more network devices (e.g., one or more traffic transfer devices) capable of processing and transferring network traffic. For example, MEP 220 may include a router, a gateway, a switch, a firewall, a hub, a bridge, a reverse proxy, a server (e.g., a proxy server, a server executing a virtual machine, etc.), a security device, an intrusion detection device, a load balancer, a line card (e.g., in a chassis-based system), or a similar type of device. In some implementations, MEP 220 is a provider edge device associated with an Ethernet MAN, a WAN, or the like. In some implementations, MEP 220 and customer edge device 210 may be associated with a user-network interface (e.g., a demarcation point between the responsibility of a service provider and the responsibility of a subscriber). For example, a user-network interface may represent an interface between MEP 220 and customer edge device 210.

Network 230 includes one or more wired and/or wireless networks. For example, network 230 may include a cellular network (e.g., a fifth generation (5G) network, a long-term evolution (LTE) network, a code division multiple access (CDMA) network, a third generation (3G) network, another type of advanced generated network, etc.), a public land mobile network (PLMN), a local area network (LAN), a WAN, a MAN, a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
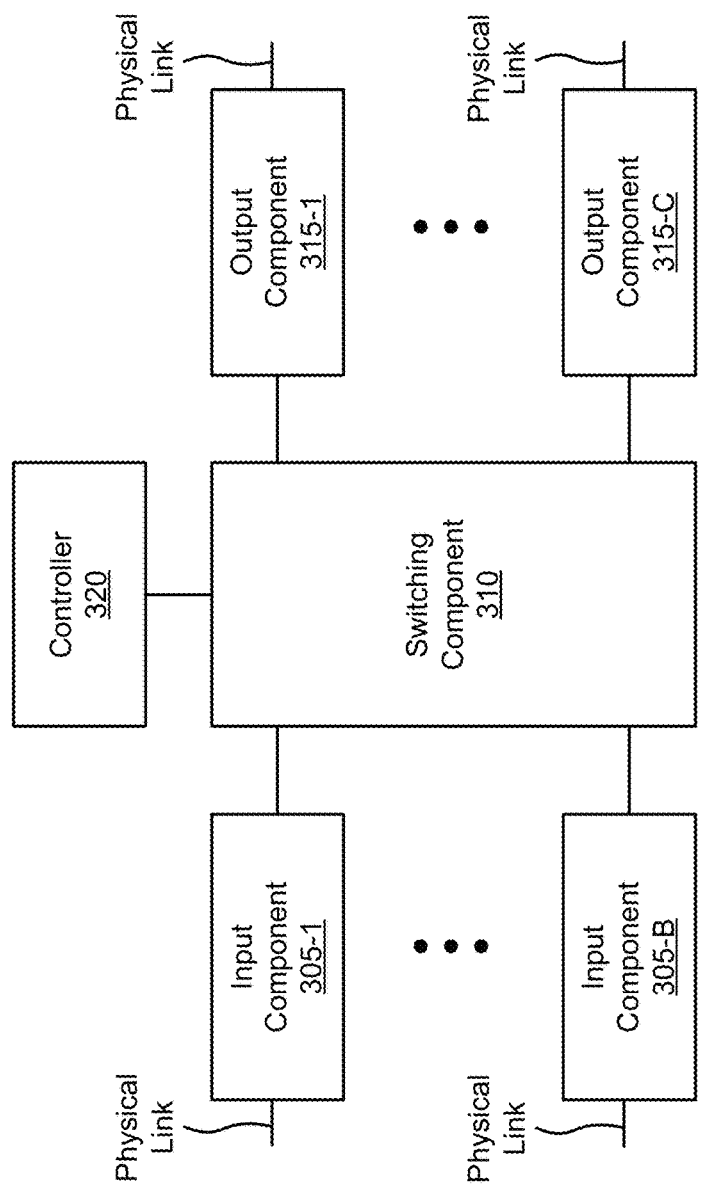
FIG. 3 is a diagram of example components of one or more devices of FIG. 2.

FIG. 3 is a diagram of example components of a device 300. Device 300 may correspond to customer edge device 210 and/or MEP 220. In some implementations, customer edge device 210 and/or MEP 220 may include one or more devices 300 and/or one or more components of device 300. As shown in FIG. 3, device 300 may include one or more input components 305-1 through 305-B (B≥1) (hereinafter referred to collectively as input components 305, and individually as input component 305), a switching component 310, one or more output components 315-1 through 315-C (C≥1) (hereinafter referred to collectively as output components 315, and individually as output component 315), and a controller 320.

Input component 305 may be points of attachment for physical links and may be points of entry for incoming traffic, such as packets. Input component 305 may process incoming traffic, such as by performing data link layer encapsulation or decapsulation. In some implementations, input component 305 may send and/or receive packets. In some implementations, input component 305 may include an input line card that includes one or more packet processing components (e.g., in the form of integrated circuits), such as one or more interface cards (IFCs), packet forwarding components, line card controller components, input ports, processors, memories, and/or input queues. In some implementations, device 300 may include one or more input components 305.

Switching component 310 may interconnect input components 305 with output components 315. In some implementations, switching component 310 may be implemented via one or more crossbars, via busses, and/or with shared memories. The shared memories may act as temporary buffers to store packets from input components 305 before the packets are eventually scheduled for delivery to output components 315. In some implementations, switching component 310 may enable input components 305, output components 315, and/or controller 320 to communicate.

Output component 315 may store packets and may schedule packets for transmission on output physical links. Output component 315 may support data link layer encapsulation or decapsulation, and/or a variety of higher-level protocols. In some implementations, output component 315 may send packets and/or receive packets. In some implementations, output component 315 may include an output line card that includes one or more packet processing components (e.g., in the form of integrated circuits), such as one or more IFCs, packet forwarding components, line card controller components, output ports, processors, memories, and/or output queues. In some implementations, device 300 may include one or more output components 315. In some implementations, input component 305 and output component 315 may be implemented by the same set of components (e.g., and input/output component may be a combination of input component 305 and output component 315).

Controller 320 includes a processor in the form of, for example, a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. The processor is implemented in hardware, firmware, or a combination of hardware and software. In some implementations, controller 320 may include one or more processors that can be programmed to perform a function.

In some implementations, controller 320 may include a random access memory (RAM), a read only memory (ROM), and/or another type of dynamic or static storage device (e.g., a flash memory, a magnetic memory, an optical memory, etc.) that stores information and/or instructions for use by controller 320.

In some implementations, controller 320 may communicate with other devices, networks, and/or systems connected to device 300 to exchange information regarding network topology. Controller 320 may create routing tables based on the network topology information, create forwarding tables based on the routing tables, and forward the forwarding tables to input components 305 and/or output components 315. Input components 305 and/or output components 315 may use the forwarding tables to perform route lookups for incoming and/or outgoing packets.

Controller 320 may perform one or more processes described herein. Controller 320 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 320 from another computer-readable medium or from another device via a communication interface. When executed, software instructions stored in a memory and/or storage component associated with controller 320 may cause controller 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
FIG. 4 is a diagram of an example message structure associated with a continuity check message including an extended interface status.

FIG. 4 is a diagram of an example message structure associated with a continuity check message including an extended interface status. For example, a first MEP 220 may provide, to a second MEP 220, a CCM including a message structure 400 as shown in FIG. 4, to enable connectivity fault management while preventing deadlocks.

As used herein, a message may refer to a communication structure for communicating information, such as a protocol data unit (PDU), a network packet, a datagram, a segment, a block, a cell, a frame, a subframe, a slot, a symbol, a portion of any of the above, and/or another type of formatted or unformatted unit of data capable of being transmitted via a network.

As shown in FIG. 4, the CCM including an extended interface status Type, Length, Value (TLV) may include a "Type" field, a "Length" Field, an "Interface Status" field, and a "MEP Identifier" field. In some implementations, the "Type" field may include information that identifies a type of CCM (e.g., that the CCM includes extended interface status information). In some implementations, the "Length" field may include information that identifies a length of the CCM (e.g., a number of fields associated with the CCM, a number of octets, a number of bytes, or the like).

In some implementations, the "Interface Status" field may include information that indicates a status of an interface of MEP 220. For example, the "Interface Status" field may include information that identifies a status, such as "up," "down," "testing," "unknown," "dormant," "notPresent," "lowerLayerDown," or the like. For example, "up" may indicate that the interface is ready to pass packets, "down" may indicate that the interface cannot pass packets, "testing" may indicate that the interface is in a test mode, "unknown" may indicate that an interface status cannot be determined, "dormant" may indicate that the interface is not in a state to pass packets however is in a pending state (e.g., awaiting an external event), "notPresent" may indicate that a component of the interface is missing, and "lowerLayerDown" may indicate that the interface is down due to a statue of a lower layer interface.

While not shown, in some implementations, the CCM may include a "Port Status TLV" that includes information that identifies an ability of a port of MEP 220 to pass data (e.g., "blocked," "up," or the like).

In some implementations, the "MEP Identifier" field may include information that identifies MEP 220 (e.g., a device identifier, an interface identifier, a port identifier, a network address, or the like).

Although FIG. 4 shows an example of a message structure associated with a continuity check message including an extended interface status, in some implementations, the message structure associated with a continuity check message including an extended interface status may include additional fields, fewer fields, different fields, or differently arranged fields than those depicted in FIG. 4.

Figure 5A:
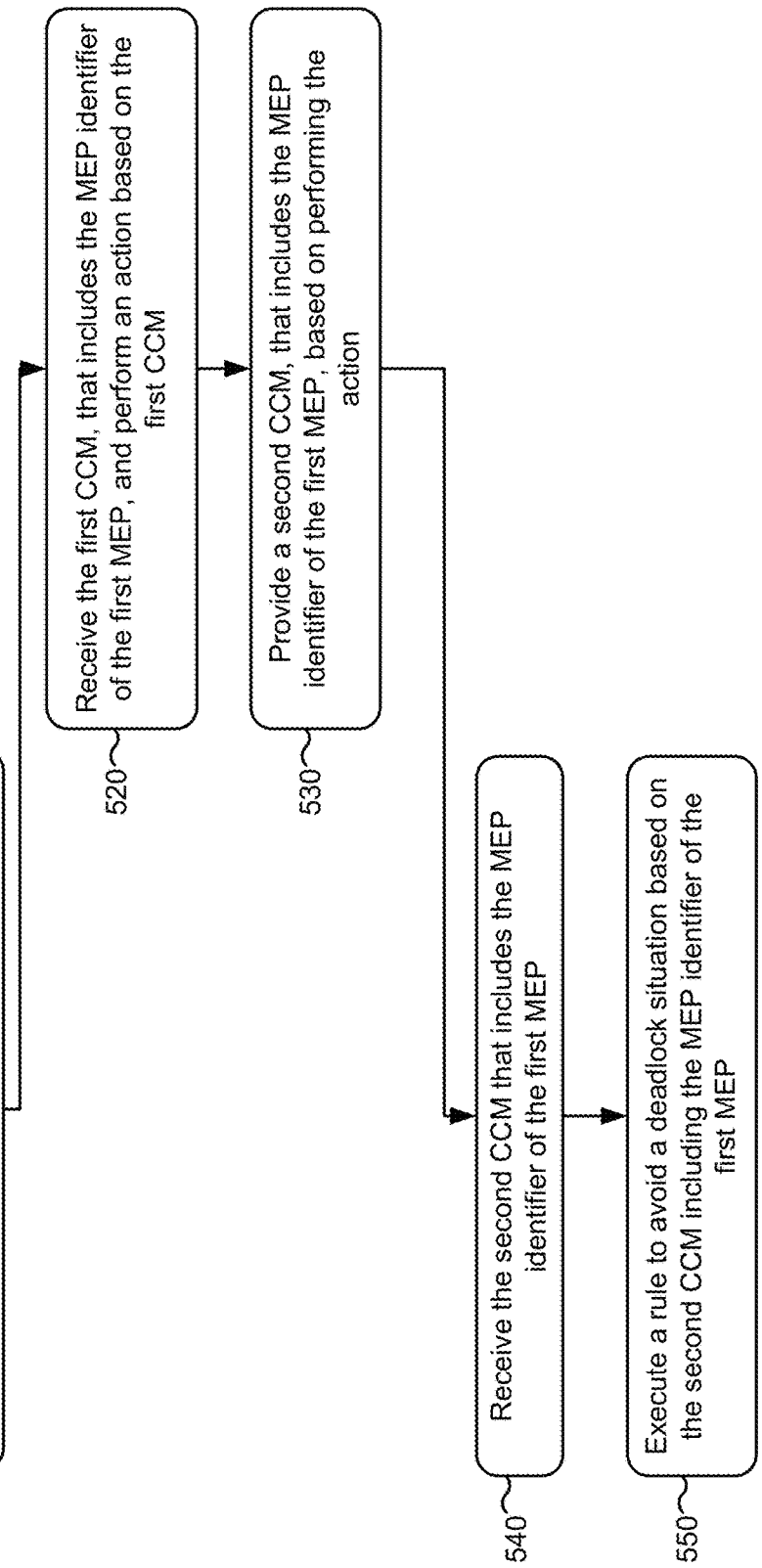
FIGS. 5A and 5B are flow charts of an example process for deadlock avoidance using modified Ethernet Connectivity Fault Management signaling.
Figure 5B:
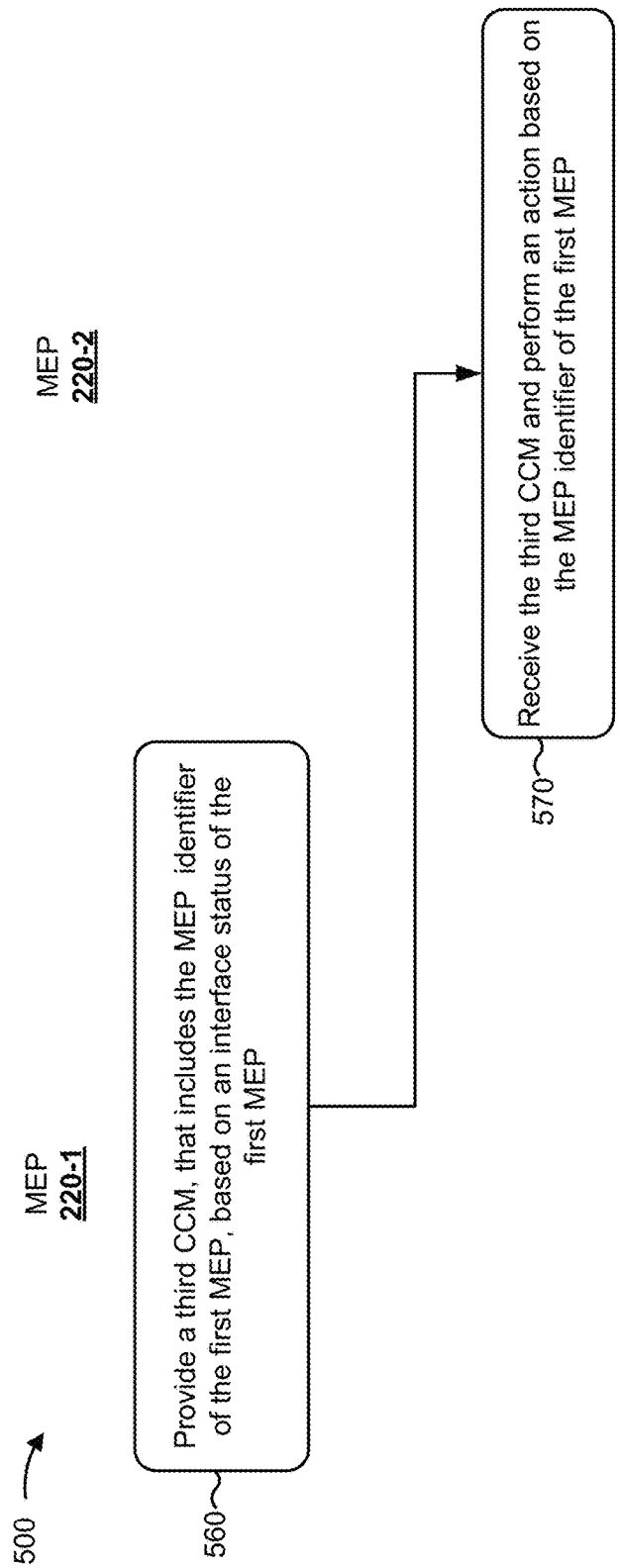

FIGS. 5A and 5B are flow charts of an example process 500 for deadlock avoidance using modified Ethernet Connectivity Fault Management signaling. In some implementations, one or more process blocks of FIGS. 5A and/or 5B may be performed by MEP 220-1 and/or MEP 220-M (e.g., referred to below as MEP 220-2). In some implementations, one or more process blocks of FIGS. 5A and/or 5B may be performed by another device or a group of devices separate from or including MEP 220-1 and/or MEP 220-2, such as customer edge device 210.

As shown in FIG. 5A, process 500 may include providing a first continuity check message (CCM), that includes a maintenance endpoint (MEP) identifier of a first MEP, based on an interface status of the first MEP being associated with a connectivity failure (block 510). For example, MEP 220-1 may provide, to MEP 220-2, a first CCM that includes a MEP identifier of MEP 220-1 based on an interface status of MEP 220-1 being associated with a connectivity failure.

In some implementations, MEP 220-1 and MEP 220-2 may be associated with a particular maintenance domain. For example, a maintenance domain may refer to a network, or a portion of a network, where faults in connectivity may be managed. Additionally, or alternatively, MEP 220-1 and MEP 220-2 may be associated with a particular maintenance association. For example, a maintenance association may refer to a set of MEPs, each configured with the same maintenance association identifier, established to monitor and verify the integrity of a service instance throughout a maintenance domain.

In some implementations, MEP 220-1 and MEP 220-2 may exchange CCMs. For example, a CCM may include a multicast PDU transmitted periodically by a particular MEP 220 in order to ensure continuity over a maintenance association to which the MEP 220 belongs (e.g., connectivity between MEPs 220, connectivity between customer edge devices 210 and MEPs 220, or the like). In some implementations, and as described above in connection with FIG. 4, a CCM may include a particular TLV format, and/or may include multiple TLV values. For example, the CCM may include a type field, a length field, a status field, and a MEP identifier field.

In some implementations, MEP 220-1 may provide the first CCM, including a MEP identifier associated with MEP 220-1, based on an interface status of MEP 220-1 being associated with a connectivity failure. In some implementations, a connectivity failure may refer to the inability of MEP 220-1 to provide network traffic to and/or receive network traffic from customer edge device 210. For example, MEP 220-1 may provide the first CCM based on a failure of a user-network interface (e.g., an optical link, or the like) between MEP 220-1 and customer edge device 210-1, a failure of an interface associated with MEP 220-1, or the like. Additionally, or alternatively, a connectivity failure may refer to MEP 220-1 failing to receive a threshold number of consecutive CCMs from another MEP 220 in the maintenance association, failing to receive particular messages from customer edge device 210-1 (e.g., heartbeat messages, or the like), or the like.

In some implementations, the first CCM may include a similar message structure as shown in FIG. 4, and may include information, in association with a "MEP Identifier" field, that identifies MEP 220-1. In this way, MEP 220-1 may advertise, throughout the maintenance association, that the user-network interface associated with MEP 220-1 and customer edge device 210-1 is designated as offline (e.g., down).

As further shown in FIG. 5A, process 500 may include receiving the first CCM, that includes the MEP identifier of the first MEP, and performing an action based on the first CCM (block 520). For example, MEP 220-2 may receive, from MEP 220-1, the first CCM, that includes the MEP identifier of MEP 220-1, and perform an action based on the first CCM.

In some implementations, MEP 220-2 may be configured with an action profile. For example, an action profile may refer to information that maps a set of events and a set of actions. In some implementations, MEP 220-2 may perform an action based on a value associated with a CCM received from MEP 220-1. As an example, if MEP 220-2 receives a CCM that includes a status of "down" in association with the "Interface Status" field of the CCM, then MEP 220-2 may designate an interface associated with MEP 220-2 as being offline (e.g., to prevent network traffic from being provided and/or received via the interface). In this way, MEP 220-2 may prevent network traffic from being provided throughout the maintenance domain, thereby reducing network congestion, packet losses, excessive latency, or the like (e.g., by preventing network traffic from being provided to MEP 220-1 which is associated with a connectivity failure).

In some implementations, MEP 220-2 may receive the first CCM, analyze the first CCM to identify values associated with particular fields of the first CCM, and detect an event based on the value(s) (e.g., that the user-network interface associated with MEP 220-1 and customer edge device 210-1 is associated with a connectivity failure). Additionally, or alternatively, MEP 220-2 may perform an action based on the event (e.g., may designate a user-network interface associated with MEP 220-2 as being offline).

In some implementations, MEP 220-2 may store information that identifies that MEP 220-2 performed the action based on a CCM associated with MEP 220-1 (e.g., MEP 220-2 caused the action to be performed based on a connectivity failure associated with MEP 220-1).

As further shown in FIG. 5A, process 500 may include providing a second CCM, that includes the MEP identifier of the first MEP, based on performing the action (block 530). For example, MEP 220-2 may provide, to MEP 220-1, a second CCM, that includes the MEP identifier of MEP 220-1, based on performing the action. In some implementations, MEP 220-2 may provide the second CCM based on designating the user-network interface associated with MEP 220-2 and customer edge device 210-2 as being offline. In this way, MEP 220-2 may advertise, to MEP 220-1 and/or other MEPs 220 of the maintenance association, that the user-network interface associated with MEP 220-2 is offline.

In some implementations, the second CCM may include the MEP identifier associated with MEP 220-1. For example, the second CCM may include a similar message structure as described in connection with FIG. 4, and include information, in association with a "MEP Identifier" field, that identifies MEP 220-1. In some implementations, MEP 220-2 may include, in the "MEP Identifier" field of the second CCM, the MEP identifier associated with MEP 220-1 based on a CCM of MEP 220-1 causing MEP 220-2 to invoke an action profile.

As further shown in FIG. 5A, process 500 may include receiving the second CCM that includes the MEP identifier of the first MEP (block 540), and executing a rule to avoid a deadlock situation based on the second CCM including the MEP identifier of the first MEP (block 550). For example, MEP 220-1 may receive, from MEP 220-2, the second CCM, that includes the MEP identifier of MEP 220-1, and execute a rule to avoid a deadlock situation based on the second CCM including the MEP identifier of MEP 220-1.

In some implementations, MEP 220-1 may receive the second CCM, analyze the second CCM, and identify information associated with the "MEP Identifier" field. Additionally, or alternatively, MEP 220-1 may compare the information associated with the "MEP Identifier" field and information that identifies a MEP identifier associated with MEP 220-1 (e.g., may compare MEP identifiers). In some implementations, if the MEP identifiers are the same, then MEP 220-1 may execute a rule to avoid a deadlock situation. For example, MEP 220-1 may prevent an action, associated with an action profile of MEP 220-1, from being performed. For example, MEP 220-1 may execute a rule to prevent an action from being performed based on a CCM that includes information identifying a MEP identifier associated with MEP 220-1, thus avoiding a potential deadlock situation from occurring.

For example, assume that the connectivity failure associated with MEP 220-1 and customer edge device 210 is rectified. In this case, if MEP 220-1 performed an action based on a CCM that was received from MEP 220-2, then a deadlock situation may occur. For example, despite the connectivity failure associated with MEP 220-1 being rectified, MEP 220-1 may receive, from MEP 220-2, a CCM that identifies that the user-network interface associated with MEP 220-2 is offline. Additionally, MEP 220-1 may perform an action (e.g., cause the user-network interface associated with MEP 220-1 to go offline) based on the CCM that identifies that the user-network interface associated with MEP 220-2 is offline (e.g., thereby causing a deadlock).

In other words, MEP 220-1 may provide a CCM identifying that a user-network interface of MEP 220-1 is offline. MEP 220-2 may designate a user-network interface of MEP 220-2 as being offline based on the CCM, and provide a CCM identifying that the user-network interface of MEP 220-2 is designated as offline (e.g., caused by the user-network interface of MEP 220-2 being offline). MEP 220-1 may receive the CCM, and incorrectly determine that the user-network interface of MEP 220-2 is associated with a connectivity failure (e.g., which is not the case). Thereafter, MEP 220-1 and MEP 220-2 may continue to exchange CCMs, and may both incorrectly determine that the other MEP 220 is associated with a connectivity failure (e.g., which is not the case).

In this way, implementations described herein reduce a number of deadlock situations caused by CFM signaling and/or action profiles, thereby improving utilization of available network resources.

As shown in FIG. 5B, process 500 may include providing a third CCM, that includes the MEP identifier of the first MEP, based on an interface status of the first MEP (block 560). For example, MEP 220-1 may provide, to MEP 220-2, a third CCM, that includes the MEP identifier of MEP 220-1, based on an interface status of MEP 220-1. In some implementations, the interface status of MEP 220-1 may not be associated with a connectivity failure. For example, assume that the connectivity failure is rectified. In this case, MEP 220-1 may provide the third CCM that includes information, associated with the "Interface Status" field, that identifies that the user-network interface associated with customer edge device 210-1 and MEP 220-1 is online.

As further shown in FIG. 5B, process 500 may include receiving the third CCM and performing an action based on the MEP identifier of the first MEP (block 570). For example, MEP 220-2 may receive, from MEP 220-1, the third CCM and perform an action based on the MEP identifier of MEP 220-1. In some implementations, MEP 220-2 may identify information associated with the "MEP Identifier" field of the third CCM, determine that the information identifies MEP 220-1, and perform an action based on the information that identifies MEP 220-1. For example, MEP 220-2 may designate the user-network interface, associated with MEP 220-2 and customer edge device 210-2, as being online. For example, MEP 220-2 may determine that MEP 220-1 (e.g., the first CCM associated with MEP 220-1) caused MEP 220-2 to perform the action (e.g., associated with block 520), and determine that MEP 220-1 is not associated with a connectivity failure based on the third CCM. In this way, MEP 220-2 may again receive network traffic from customer edge device 210-2, and provide the network traffic to customer edge device 210-1 via MEP 220-1 (or vice versa).

In this way, implementations described herein reduce a number of deadlock situations caused by CFM signaling and/or action profiles, thereby improving network resource utilization. For example, implementations described herein enable MEPs 220 to exchange CCMs and perform actions based on the CCMs, thereby enabling traffic to be diverted from a maintenance association in the event of a connectivity failure, and thereby conserving processor and/or memory resources of customer edge devices 210, MEPs 220, and/or network resources. Additionally, implementations described herein prevent deadlock situations associated with CCM exchanges, thereby reducing an amount of time associated with a maintenance association being offline, reducing a need of a network administrator to re-configure MEPs 220, enabling MEPs 220 to carry network traffic, and/or the like. In this way, implementations described herein improve network resource utilization by enabling MEPs 220, that are capable of providing network traffic, to carry network traffic.

Although FIGS. 5A and 5B show example blocks of process 500, in some implementations, process 500 may include additional blocks, fewer blocks, different blocks, or differently arranged blocks than those depicted in FIGS. 5A and 5B. Additionally, or alternatively, two or more of the blocks of process 500 may be performed in parallel.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A first maintenance endpoint (MEP) device, comprising:
a memory; and
one or more processors to:

receive, from a second MEP device, a first continuity check message (CCM) based on a first interface status of the second MEP device,
    the first CCM including a MEP identifier of the second MEP device;
perform an action based on an action profile and based on receiving the first CCM;
provide, to the second MEP device, a second CCM that includes the MEP identifier of the second MEP device and information indicating that the action was performed,
    the second CCM to cause the second MEP device to execute a rule to avoid a deadlock situation; and
designate an interface status of the first MEP device based receiving a third CCM that identifies a second interface status of the second MEP device,
    the first interface status of the second MEP device being different than the second interface status of the second MEP device.

2. The first MEP device of claim 1, where the one or more processors are further to:
analyze, after receiving the first CCM, the first CCM to identify values associated with a particular field of the first CCM; and
detect, based on the values, that the first interface status of the second MEP device is associated with a connectivity failure.

3. The first MEP device of claim 1, where the one or more processors, when performing the action, are to:
prevent network traffic from being received via an interface of the first MEP device based on determining that the second MEP device is associated with a connectivity failure.

4. The first MEP device of claim 1, where the one or more processors are further to:
store information that identifies that the first MEP device performed the action.

5. The first MEP device of claim 1, where the one or more processors are further to:
designate the interface status the first MEP device as being offline based on the action profile.

6. The first MEP device of claim 5, where the one or more processors are further to:
advertise the second CCM to one or more other MEP devices based on designating the interface status of the first MEP device as being offline.

7. A non-transitory computer-readable medium storing instructions, the instructions comprising:
one or more instructions that, when executed by one or more processors by a first maintenance endpoint (MEP) device, cause the one or more processors to:
    receive, from a second MEP device, a first continuity check message (CCM) based on a first interface status of the second MEP device,
        the first CCM including a MEP identifier of the second MEP device;
    perform an action based on an action profile and receiving the first CCM;
    provide, to the second MEP device, a second CCM that includes the MEP identifier of the second MEP device and information indicating that the action was performed,
        the second CCM to cause the second MEP device to execute a rule to avoid a deadlock situation; and
    designate an interface status of the first MEP device based receiving a third CCM that identifies a second interface status of the second MEP device,
        the first interface status of the second MEP device being different than the second interface status of the second MEP device.

8. The non-transitory computer-readable medium of claim 7, where the one or more instructions, when executed by the one or more processors, further cause the one or more processors to:
analyze, after receiving the first CCM, the first CCM to identify values associated with a particular field of the first CCM; and
detect, based on the values, that the first interface status of the second MEP device is associated with a connectivity failure.

9. The non-transitory computer-readable medium of claim 7, where the one or more instructions, that perform the action, cause the one or more processors to:
prevent network traffic from being received via an interface of the first MEP device based on determining that the second MEP device is associated with a connectivity failure.

10. The non-transitory computer-readable medium of claim 7, where the one or more instructions, when executed by the one or more processors, further cause the one or more processors to:
store information that identifies that the first MEP device performed the action.

11. The non-transitory computer-readable medium of claim 7, where the one or more instructions, when executed by the one or more processors, further cause the one or more processors to:
designate the interface status the first MEP device as being offline based on the action profile.

12. The non-transitory computer-readable medium of claim 11, where the one or more instructions, when executed by the one or more processors, further cause the one or more processors to:
advertise the second CCM to one or more other MEP devices based on designating the interface status of the first MEP device as being offline.

13. A method comprising:
receiving, by a first maintenance endpoint (MEP) device and from a second MEP device, a first continuity check message (CCM) based on a first interface status of the second MEP device,
    the first CCM including a MEP identifier of the second MEP device;
performing, by the first MEP device, an action based on an action profile and receiving the first CCM;
providing, by the first MEP device and to the second MEP device, a second CCM that includes the MEP identifier of the second MEP device and information indicating that the action was performed,
    the second CCM to cause the second MEP device to execute a rule to avoid a deadlock situation; and
designating, by the first MEP device, an interface status of the first MEP device based receiving a third CCM that identifies a second interface status of the second MEP device,
    the first interface status of the second MEP device being different than the second interface status of the second MEP device.

14. The method of claim 13, further comprising:
analyzing, after receiving the first CCM, the first CCM to identify values associated with a particular field of the first CCM; and detecting, based on the values, that the first interface status of the second MEP device is associated with a connectivity failure.

15. The method of claim 13, where performing the action comprises:
preventing network traffic from being received via an interface of the first MEP device based on determining that the second MEP device is associated with a connectivity failure.

16. The method of claim 13, comprising:
storing information that identifies that the first MEP device performed the action.

17. The method of claim 13, comprising:
designating the interface status the first MEP device as being offline based on the action profile; and
advertising the second CCM to one or more other MEP devices based on designating the interface status of the first MEP device as being offline.

18. The first MEP device of claim 1, where the one or more processors, when designating the first interface status of the first MEP device, are to:
designate the first interface status of the first MEP device as being capable of receiving and providing network traffic.

19. The non-transitory computer-readable medium of claim 7, where the one or more instructions, that designate the interface status of the first MEP device, cause the one or more processors to:
designate the first interface status of the first MEP device as being capable of receiving and providing network traffic.

20. The method of claim 13, where designating the interface status of the first MEP device comprises:
designating the first interface status of the first MEP device as being capable of receiving and providing network traffic.

* * * * *